though thermal activation.

United States Patent Office
3,533,996
Patented Oct. 13, 1970

3,533,996
PREPARATION OF CROSSLINKED POLYIMIDES FROM N,N'-BIS-IMIDES
Friedrich Grundschober, Confignon, Geneva, and Joerg Sambeth, Carouge, Geneva, Switzerland, assignors to Societe Rhodiaceta, Paris, France, a firm
No Drawing. Continuation-in-part of applications Ser. No. 507,656, Nov. 15, 1965, and Ser. No. 637,054, May 9, 1967. This application Jan. 19, 1968, Ser. No. 699,043
Claims priority, application Switzerland, Jan. 26, 1967, 1,189/67
Int. Cl. C08g 29/20
U.S. Cl. 260—47
8 Claims

ABSTRACT OF THE DISCLOSURE

The invention provides a method of producing a molded article made of a cross-linked polyimide resin by pouring molten monomer—an N,N'-bis-imide of an unsaturated dicarboxylic acid—into a mold wherein it is then polymerized through heating. The method comprises adding to the monomer, prior to introduction into the mold, a polymerization retarding substance which is an antioxidant so as to increase the pot-life of the monomer thereby enabling the production of molded articles of complex shape.

---

This application in a joint continuation-in-part of copending applications Ser. No. 507,656 filed Nov. 15, 1965, now Pat. No. 3,380,964 and of Ser. No. 637,054 filed May 9, 1967 now Pat. No. 3,406,148.

The present invention relates to a method of producing a molded article made of the cross-linked polyimide resin disclosed in the above-cited applications.

The starting material for making this polyimide resin is an N,N'-bis-imide of an unsaturated dicarboxylic acid of the general formula

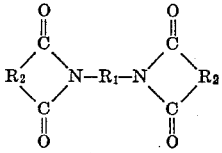

wherein $R_1$ is a bivalent radical comprising at least two carbon atoms selected from the group consisting of an alkylene residue, an arylene residue, a halogen substituted arylene residue, a cyclohexyl residue, a plurality of arylene residues bonded either directly or by at least one of the following radicals:

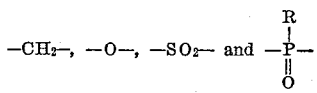

a plurality of halogen substituted arylene residues bonded either directly or by at least one of the following radicals:

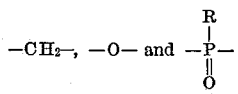

wherein R is an aryl group, and at least two cyclohexyl residues bonded to one another, through a —CH₂— radical; and $R_2$ is a bivalent radical having the formula

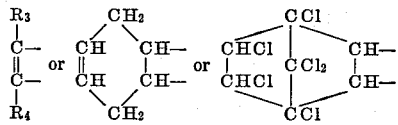

wherein $R_3$ is H, CH₃ or a halogen atoms and $R_4$ is hydrogen or a halogen atom.

In the specifications of the above-cited applications there is disclosed, besides the polyimide resin and a method of making same, a method of producing molded articles made of such resin.

One of the disclosed ways of practicing the method of producing molded articles consists in first melting the N,N'-bis-imide, and then rapidly pouring the molten N,N'-bis-imide into a mold wherein it is polymerized at atmospheric pressure while maintaining its temperature at between 80 and 400° C. for the length of time necessary to produce a molded body of cross-linked polyimide resin.

This method of producing molded bodies of polyimide resin is simple and does not require the use of costly apparatus but the actual practice of this method is sometimes tricky. The reason for this is that the pouring operation into the mold must, obviously, be carried out while the bis-imide is sufficiently fluid, i.e. between the time when complete fusion has occurred and the time when polymerization has reached a stage such that the viscosity of the product no longer enables the pouring operation to be continued. This period of time, during which pouring is possible, is generally termed "pot-life." In the absence of a polymerization catalyst, the pot-life is very short and this is clearly a disadvantage, particularly so when it is desired to produce molded bodies of complex shape.

An object of the present invention is to overcome this disadvantage.

According to the present invention there is provided a method of producing a molded article made of a cross-linked polyimide resin, which comprises introducing, in a molten state, into a mold at least one N,N'-bis-imide of an unsaturated dicarboxylic acid of the general formula

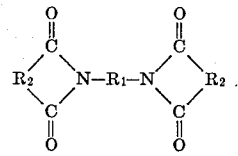

wherein $R_1$ and $R_2$ are as defined above, adding to the N,N'-bis-imide, prior to the introduction thereof into said mold from 0.01 to 1% by weight based on the N,N'-bis-imide of a polymerization retarding substance which is an antioxidant thereby to increase the pot-life of the molten N,N'-bis-imide, and polymerizing said N,N'-bis-imide in said mold by maintaining the contents of the mold at a temperature lying between 80 and 400° C. for the length of time necessary to produce said molded article.

Thus, with the method according to the present invention the N,N'-bis-imides of unsaturated dicarboxylic acids are polymerized in a molten state in the absence of a catalyst after having added thereto a substance which slows down the initial rate of polymerization, so as to extend the period during which the product retains suffiicent fluidity to be poured into a mold of desired shape which may be quite complex, i.e. formed with cavities small enough to necessitate, in order to ensure complete filling thereof, a state of high fluidity of the liquid over a prolonged period of time.

The temperature to which the product to be poured has to be raised is preferably only slightly higher than its melting point, this being enough to provide the product with a sufficient fluidity and with a satisfactory homogeneity. The product should however not be heated to a temperature which exceeds the melting temperature to too great an extent in order not to unduly increase the rate of polymerization though thermal activation.

Polymerization of the bis-imide once poured into the mold is achieved by maintaining its temperature between 80 and 400° C. for as long as is necessary.

The resultant resins have mechanical strength and thermal stability properties that are identical to those of resins which have been polymerized in the absence of polymerization retarding substances and that are even better than those of resins which have been polymerized in the presence of a catalyst.

The substances which have a retarding action on the polymerization of the N,N'-bis-imides of dicarboxylic acids are generally antioxidants, i.e. they act by inhibiting oxidation.

The antioxidants which give the best results are phenols, in particular thiophenols and phenol amines; aromatic amines, in particular N,N'-disubstituted p-phenylene diamines; aromatic aldols; and substituted hydroquinolines.

Thus, use is for instance made of the following antioxidants:

hydroquinone
2,6-ditertiary butyl-p-cresol
methylene-bis-2,2'(6-tertiary butyl-p-cresol)
thio-bis-2,2'(6-tertiary butyl-p-cresol)
thio-bis-4,4-(6-tertiary butyl-o-cresol)
phenyl-α-naphthylamine
phenyl-β-naphthylamine
ditolylamine
aldol-α-naphthylamine
dinaphthyl-p-phenylene-diamine
phenylcyclohexyl-p-phenylene-diamine
N-isopropyl-N'-phenyl-p-phenylene-diamine
N,N'-dioctyl-p-phenylene-diamine
disalicylal-propylene-diamine
6-ethoxy-2,2,4-trimethyl-1,2-dihydro-quinoline The amounts of these substances to be used lie between 0.01 and 1% by weight of the bis-imide to be polymerized. It is not possible to extend the pot-life indefinitely by increasing the amounts of retarding agent beyond a certain proportion lying within the above limits.

As regards the N,N'-bis-imides, use is preferably made of those given in the specifications of the above-mentioned patents, in particular:

N,N'-ethylene-bis-maleimide
N,N'-hexamethylene-bis-maleimide
N,N'-1,3-phenylene-bis-maleimide
N,N'-1,4-phenylene-bis-maleimide
N,N'-4,4'-diphenylmethane-bis-maleimide
N,N'-4,4'-diphenylether-bis-maleimide
N,N'-diphenylsulphone-bis-maleimide
N,N'-dicyclohexylmethane-bis-maleimide
N,N'-α,α'-p-dimethylene-cyclohexane-bis-maleimide
N,N'-1,3-xylylene-bis-maleimide
N,N'-(4-chloro-1,3-phenylene)bis-maleimide
N,N'-(2,5-dichloro-1,3-phenylene)bis-maleimide
N,N'-(3,3'-dichloro-4,4'-diphenylether)bis-maleimide
N,N'-(3,3'-dichloro-4,4'-biphenylene)bis-maleimide
N,N'-(3,5,3',5'-tetrachloro-4,4'-biphenylene)bis-maleimide
N,N'-(3,3'-dibromo-4,4'-biphenylene)bis-maleimide
N,N'-(3,3'-dichloro-4,4'-diphenylmethane bis-maleimide
N,N'-(triphenylphosphine-oxide)bis-dichloromaleimide
N,N'-4,4'-diphenylether-bis-dichloromaleimide
N,N'-(3,3'-dichloro-4,4'-biphenylene)bis-dichloromaleimide
N,N'-(3,3'-dibromo-4,4'-diphenylmethane)bis-dichloromaleimide
N,N'-4,4'-diphenylether-bis-hexachloroendomethylenetetrahydrophthalimide
N,N'-(2,2'-dichloro-3,3'-dimethyl-4,4'-biphenylene)bis-hexachloroendomethylenetetrahydrophthalimide
N,N'-4,4'-diphenylmethane-bis-hexachloroendomethyleneoctahydronaphthylimide.

Use can also be made of an N,N'-bis-imide of citraconic acid or tetrahydrophthalic acid. The following examples further illustrate the invention:

EXAMPLE 1

10 g. of N,N'-4,4'-diphenylether-bis-maleimide (melting point 180–184° C.) was melted in the presence of 0.05 g. of hydroquinone, and the temperature was raised up to 200° C. so as to obtain a translucent liquid of homogeneous appearance.

The length of time (pot-life) that elapsed between the moment the liquid reached sufficient fluidity to be poured into a mold of complex shape and the moment its viscosity became too great to continue pouring was 21 minutes.

Under the same conditions, pure N,N'-4,4'-diphenyl-ether-bis-maleimide had a pot-life of only 4 minutes, so that it could only be poured into molds of simple shape.

Once poured, the mixture was heated for 18 hours at 200° C. and an infusible and insoluble molded body was produced which started to darken at 470° C. and which decomposed at 490° C. Its density was 1.4.

EXAMPLE 2

The procedure was the same as in Example 1, with 10 g. of N,N'-4,4'-diphenylether-bis-maleimide, but with 0.05 g. of methylene-bis-2,2'(6-tertiary butyl-p-cresol) (a product sold under the designation "Antioxidant 2246"). The pot-life was 9 minutes.

The resulting polymer was identical to that of Example 1.

EXAMPLE 3

Example 1 was repeated using with 10 g. of N,N'-4,4'-diphenylether-bis-maleimide, but with 0.05 g. of thio-bis-2,2'(6-tertiary butyl-p-cresol). The pot-life was 11 minutes.

The resulting polymer was identical to that of Example 1.

EXAMPLE 4

Example 1 was repeated using 10 g. of N,N'-4,4'-diphenylether-bis-maleimide, but with 0.05 g. of phenyl-α-naphthylamine. The pot-life was 8 minutes.

The resultant polymer was identical to that of Example 1.

EXAMPLE 5

Example 1 was repeated using 10 g. of N,N'-4,4'-diphenylether-bis-maleimide, but with 0.05 g. of N-isopropyl-N'-phenyl-p-phenylene-diamine (a product sold under the designation "Antioxidant 4010 NA"). The pot-life was 14 minutes.

The resultant polymer was identical to that of Example 1.

EXAMPLE 6

Example 1 was repeated using 10 g. of N,N'-4,4'-diphenylether-bis-maleimide, but with 0.05 g. of N,N'-dioctyl-p-phenylene-diamine (a product sold under the designation "Antioxidant UOP 88"). The pot-life was 12 minutes.

The resultant polymer was identical to that of Example 1.

EXAMPLE 7

10 g. of N,N' - 4,4' - diphenylmethane-bis-maleimide (melting point 158° C.) was melted in the presence of 0.01 g. of hydroquinone and the temperature was raised to 170° C. so as to obtain a translucent and homogeneous liquid. The pot-life was 30 minutes whereas that of N,N'-4,4' - diphenylmethane - bis - maleimide melted under the same conditions but in the absence of hydroquinone was only 6 minutes.

A Vicat hardness test indicated a needle penetration of 0.1 mm. at 350° C. and of 0.4 mm. at 400° C.

Resistivity was $1.6 \cdot 10^{14}$ ohm-cm. at ambient temperature.

After heating for 40 hours at 160° C., an infusible and insoluble product was obtained having a density of 1.30.

EXAMPLE 8

10 g. of N,N'-1,3-phenylene-bis-maleimide was melted in the presence of 0.01 g. of hydroquinone and the temperature was raised to 215° C. so as to obtain a translucent and homogeneous liquid. The pot-life was 12 minutes whereas that of N,N'-1,3-phenylene-bis-maleimide melted under the same conditions but in the absence of hydroquinone was only 6 minutes.

Once poured, the mixture was heated for 88 hours at 220° C. and the resultant product was a molded body which had a density of 1.42, which was homogeneous, infusible and insoluble, and which decomposed at about 460° C.

The electrical properties of this product were as follows.

Dielectric constant at 50 c./s.:
  At 22° C.: 5.1
  At 200° C.: 5.2
  At 250° C.: 5.7
Tangent of power factor at 50 c./s.:
  At 22° C.: $2 \cdot 10^{-3}$
  At 200° C.: $2 \cdot 10^{-3}$
  At 250° C.: $8.5 \cdot 10^{-3}$
Resistivity at 22° C.: $1.15 \cdot 10^{15}$ ohm-cm.

This product was therefore an excellent electric insulator and dielectric which did not lose its properties when heated at 250° C.

EXAMPLE 9

10 g. of N,N'-4,4'-diphenylether-bis-maleimide, to which 0.05 g. of hydroquinone had previously been mixed, was heated until fully melted; 6 g. of silicon oxide was then added and, after degassing this mixture, the latter was poured into a mold of desired shape and was heated at 200° C. for 3 days.

An insfusible and insoluble molded body was obtained which decomposed at 470° C. and which had the same electrical properties as a molded body made under the same conditions, by polymerizing N,N'-4,4'-dihpenylether-bis-maleimide, but in the absence of hydroquinone, to wit:

| | At 22° C. | At 200° C. | At 250° C. |
|---|---|---|---|
| Dielectric constant (at 50 c./s.) | 5.4 | 5.5 | 5.8 |
| Tangent δ (power factor) (at 50 c./s.) | $2 \cdot 10^{-3}$ | $2 \cdot 10^{-3}$ | $5 \cdot 10^{-3}$ |
| Resistivity | $^1 8 \cdot 10^{14}$ | | |

$^1$ Ohm-cm.
NOTE.—The Vicat needle penetrated 0.1 mm. at 400° C.

What is claimed is:
1. A method of producing a molded article made of a cross-linked polyimide resin, which comprises introducing, in a molten state, into a mold at least one N,N'-bis-imide of an unsaturated dicarboxylic acid of the general formula

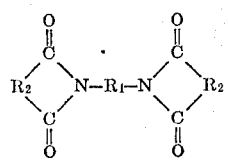

wherein $R_1$ is a bivalent radical comprising at least two carbon atoms selected from the group consisting of an alkylene residue, an arylene residue, a halogen substituted arylene residue, a cyclohexyl residue, a plurality of arylene residues bonded either directly or by at least one of the following radicals:

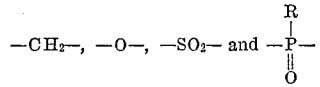

a plurality of halogen substituted arylene residues bonded either directly or by at least one of the following radicals:

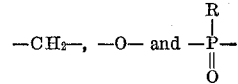

wherein R is an aryl group, and at least two cyclohexyl residues bonded to one another, through a —$CH_2$— radical; and $R_2$ is a bivalent radical having the formula

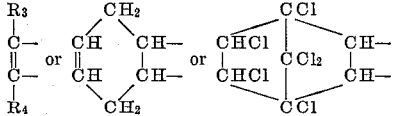

wherein $R_3$ is H, $CH_3$ or a halogen atom and $R_4$ is hydrogen or a halogen atom, to which has been added from 0.01 to 1% by weight, based on the N,N'-bis-imide of a polymerization retarding substance which is an antioxidant thereby to increase the pot-life of the molten N,N'-bis-imide and reacting the molten bis-imide to form a cross-linked, insoluble and infusible polyimide resin, at a temperature between 80° and 400° C. for the length of time necessary to produce a molded body of the cross-linked polyimide resin.

2. A method as claimed in claim 1, wherein the antioxidant is a phenol.

3. A method as claimed in claim 2, wherein the phenol is hydroquinone or methylene-bis-2,2'(6-tertiary butyl-p-cresol).

4. A method as claimed in claim 2, wherein the phenol is a thiophenol.

5. A method as claimed in claim 4, wherein the thiophenol is thio-bis-2,2'(6-tertiary butyl-p-cresol).

6. A method as claimed in claim 1, wherein the antioxidant is an aromatic amine.

7. A method as claimed in claim 6, wherein the aromatic amine is phenyl-α or β-naphthylamine, N-isopropyl-N'-phenyl-p-phenylene diamine, or N,N'-dioctyl-p-phenylene diamine.

8. A method as claimed in claim 1, wherein polymerization of the N,N'-bis-imide in the mold takes place at atmospheric pressure.

References Cited
UNITED STATES PATENTS

| 2,890,206 | 6/1959 | Kraiman | 260—78 |
| 2,890,207 | 6/1959 | Kraiman | 260—78 |
| 2,971,944 | 2/1961 | Chow et al. | 260—78 |
| 3,074,915 | 1/1963 | Chow | 260—78 |
| 3,380,964 | 4/1968 | Grundschober et al. | 260—78 |
| 3,406,148 | 10/1968 | Sambeth et al. | 260—78 |

HAROLD D. ANDERSON, Primary Examiner

U.S. Cl. X. R.
260—78, 45.9, 45.95